United States Patent [19]

Menge

[11] 4,238,512

[45] Dec. 9, 1980

[54] PRODUCTION OF A NATURAL LEAVENED DOUGH FOR THE PREPARATION OF BREAD AND PASTRIES

[76] Inventor: Wilhelm Menge, Hauptstrasse 54, 3004 Isernhagen 2, Fed. Rep. of Germany

[21] Appl. No.: 34,076

[22] Filed: Apr. 27, 1979

Related U.S. Application Data

[63] Continuation of Ser. No. 778,662, Mar. 17, 1977, abandoned.

[30] Foreign Application Priority Data

Mar. 20, 1976 [DE] Fed. Rep. of Germany ....... 2611916
Mar. 20, 1976 [DE] Fed. Rep. of Germany ....... 2611972
Oct. 8, 1976 [DE] Fed. Rep. of Germany ....... 2645457

[51] Int. Cl.$^3$ .................... A21D 2/08; A21D 15/00
[52] U.S. Cl. .................................. 426/20; 426/21; 426/25; 426/128; 426/392; 426/549; 426/556; 426/653
[58] Field of Search .............. 426/20, 21, 25, 28, 426/52, 128, 392, 549, 556, 653

[56] References Cited

U.S. PATENT DOCUMENTS

2,060,264  11/1936  Swift ................................. 426/20

FOREIGN PATENT DOCUMENTS

1241382  6/1967  Fed. Rep. of Germany .

OTHER PUBLICATIONS

Pyler, *Baking Science and Technology*, vol. II, (1973), Siebel Publishing Co., Chicago, 782–793.
Schultz, "Rye Bread Production", *The Bakers Digest*, 40(4), (1966), 77–80.

*Primary Examiner*—Esther M. Kepplinger
*Attorney, Agent, or Firm*—Schwartz, Jeffery, Schwaab, Mack, Blumenthal & Koch

[57] ABSTRACT

In the production of a natural leavened dough for the preparation of bread and pastries, a culture of isolated leavening dough bacteria is added to a cereal mash, the bacteria being of the kind which form lactic and acetic acid, and the leavening dough bacteria are allowed to form acid in said cereal mash until bacteriological metabolic activity is inhibited by the lactic and acetic acid produced. Preferably the formation of lactic and acetic acid is allowed to continue until, because of the formation of the acid, the bacteriological metabolic production is so inhibited that self preservation is allowed.

24 Claims, No Drawings

PRODUCTION OF A NATURAL LEAVENED DOUGH FOR THE PREPARATION OF BREAD AND PASTRIES

This is a continuation, of application Ser. No. 778,662, filed Mar. 17, 1977, now abandoned.

BACKGROUND OF THE INVENTION

The invention relates to a method of producing a natural leavened dough for the preparation of bread and pastries by using a pure or mixed culture of bread-leavening bacteria which form lactic and acetic acid, which culture is added to a cereal mash, lactic and acetic acid being formed in the cereal mash.

Baking with a natural leavening agent imparts to the baked product an excellent taste and very pleasant aroma. Thus, the natural bacteriological leavening of dough must be regarded as extremely advantageous particularly since such a baking method, using no chemical agents at all, provides a natural and very hygienic product. Recent scientific medical publications have clearly shown that the highest hygienic value is placed upon natural leavening of dough particularly when whole-meal rye groats are used.

However, the production of a naturally leavened dough is uneconomical. The main reason for this is that large quantities of leavened dough are required in order to impart to the product the taste and aroma of the naturally leavened baked material. Furthermore, the production of the leavened dough as a shortening material, two-stage material or three-stage material is extremely time-consuming.

Within the art, efforts have been made to rationalize the production of leavened dough by means of known methods such as the rotating ring method, which can be regarded as a discontinuous-continuous method, and the silo method. Such production methods however require costly apparatus which, in addition, is prone to breakdown.

The main disadvantage in the production of a naturally leavened baked material is that the amount of previously leavened material in the dough is disproportionately great. It has also been established that a further considerable disadvantage in the production of naturally leavened baked material is that the naturally leavened initial dough has to be produced over a lengthy period of time involving many different stages, the duration of which and the temperature used therein require to be accurately controlled.

However, the greatest disadvantage is that a naturally leavened initial dough, produced by the prior art methods, must be used up immediately following the leavening stages. This means that for each charge of dough, the quantity of initial dough required therefor has to be produced and processed in a precise manner suited to the amount of each charge. It will be readily seen that this sets extremely narrow limits upon the time available, particularly in the industrial preparation of pastries, and this is also the reason why naturally leavened baked material is hardly ever produced on an industrial scale.

It has also to be emphasised that methods of producing naturally leavened baked material have not been adopted because the individual leavening stages for forming leavened dough bacteria have been carried out on the entire quantities of the dough proper or on certain quantities thereof, and not on an initial dough. In carrying out the leavening stage on the entire quantity of dough necessary for the baking operation a considerably greater amount of time is required to achieve the required degree of leavening in all of the dough.

Furthermore, pastries produced industrially by the prior art methods exhibit unduly limited keeping qualities. Expensive preservatives therefore have to be added to the dough. Such preservatives adversely affect the taste of the product considerably but are necessary to ensure that the product will keep for a reasonable minimum period of time.

SUMMARY OF THE INVENTION

The invention has among its objects to provide a baking method using a natural leavening agent, which method mitigates the above-stated disadvantages and enables baking using a natural leavening agent to be carried out in a simple and safe manner but, in particular, economically and without the expenditure of much time.

A particular object that the invention seeks to achieve is to effect a considerable reduction in the quantity of leavened dough required for natural leavening accompanied by an agreeable taste, so as to enable a naturally leavened bread to be produced more economically.

A further object of the invention is to provide a natural leavened dough which can be kept for a lengthy period without adverse effect upon taste and the baking properties of the dough so as to increase the time available for processing it.

According to the invention these objects are achieved in that isolated leavening dough bacteria in cereal mash forming an initial dough are allowed to form acid until bacteriological metabolic activity is inhibited by the lactic and acetic acid produced.

The object of the invention is preferably achieved in that the formation of lactic and acetic acid in the natural leavening dough is continued until, because of the formation of acid, the bacteriological metabolic production is so inhibited that self-preservation occurs, and in that the liquid leavening dough concentrate so obtained is packaged in an air-tight and acid-resisting manner or is subjected to a suitable drying treatment.

The initial dough, in which the leavening dough bacteria were allowed to form acids until bacteriological metabolic activity was inhibited, is mixed with the particular quantity of cereal groats or meal, with water and with a salt mixture and/or yeast-salt mixture; is kneaded and thereafter fermented batchwise; and finally is baked.

For producing the leavening dough, use is preferably made of isolated leavening dough bacteria from the hetero-fermentative lactic or acetic acid bacteria group, particularly lactobacillus brevis and/or fermenti, and the initial dough itself is produced from water and cereal flour or meal in the same proportions and from an isolated hetero-fermentative bacteriological inoculant in an amount of approximately 10% of the amount of cereal, which inoculant is previously fermented for roughly 48 hours at approximately 27° C. The leavening dough produced in this way and fermented for a suitable length of time is allowed to form acid until the metabolic activity is inhibited.

Since in the past the basic principle has been to avoid excess acidification of the starting material at any cost, the experts in the field have been deflected from the idea underlying the present invention, i.e. that of intentionally inducing excess acidification. In this connection reference is made to the book "Der praktische Bäcker" by Dr. E. Fritsch et al, page 295, first paragraph, wherein it is stated that the expert must guard strictly against any excess acidification of the starting material used for the leavening dough.

DESCRIPTION OF THE PREFERRED EMBODIMENT

Based on the fact that a natural leavening dough is used in the baking method of the invention by allowing the baking dough bacteria to form acid until all bacteriological metabolic activity is discontinued, an initial dough is obtained without the use of any chemical agent and having a natural acid concentration that is not excessive. By mixing and kneading this initial dough with suitable amounts of cereal flour or meal, water and quantities of yeast-salt, a large quantity of dough can be naturally leavened in a very pleasant-smelling and satisfactory manner by means of a small quantity of initial dough. As shown in the examples provided below, a saving of at least one-third in the quantity of initial dough required can be achieved.

A further considerable advantage is that by continuing the formation of acid until all bacteriological metabolic activity is discontinued, secondary fermentation can be completely avoided so that the prerequisite for self-preservation is provided since no further metabolic activity can take place. To avoid biological contamination of the initial dough and to enable the material to be stored for lengthy periods, it is advantageous to package the initial dough so produced in an air-tight and acid-resisting manner or to subject it to a suitable drying treatment. In industrial concerns producing large quantities of leavened baked goods and wherein long-term storage is precluded for reasons of space, it suffices to store the initial dough, produced in accordance with the invention, in sealed bins.

Such measures enable the initial dough to be used at any time without precisely conducted leavening treatments having to be carried out beforehand. This results in a completely free choice as regards the time at which naturally leavened baked goods are produced, so that the baking method in accordance with the invention is particularly suitable not only for bread-baking on an industrial scale but also for baking by the housewife. The initial dough can be kept for up to six months if contained in an air-tight and acid-resisting packaging or if subjected to a suitable drying treatment, so that its extended availability in terms of time becomes particularly clear.

Since, for preparing the initial dough, use is made of pure or mixed cultures of isolated hetero-fermentative micro-organisms selected from the group of bacteria that form lactic and acetic acid, for example lactobacillus brevis or fermenti, this ensures that lactic acid and acetic acid are formed in such a ratio that a pleasant taste is obtained without too much lactic acid and therefore a stale taste, or too much acetic acid and therefore a sour taste being created. This result would not be ensured by the use of a mixed culture that contained types of micro-organisms other than the hetero-fermentative types.

Because of the use of a long-lasting natural leavening agent, packed in an air-tight manner and comprising an isolated mono-culture of the hetero-fermentative lactic acid bacteria no variations occur as regards aroma or in the fermentation and baking operations. All variations of this kind are attributable to the greatly varying properties of the non-isolated multi-strain lactic acid bacteria, used in the prior art processes, and to the difficult-to-handle single-stage or multi-stage earlier methods of producing leavened dough.

However, particular attention should be drawn to the fact that no very difficult and time-consuming multi-stage processing of the leavened dough is involved in the method in accordance with the invention.

Since no other chemical agents, such as for example preservatives, are required for producing the leavened dough, a pure, health-giving natural product can be obtained. The bread produced therefrom meets the requirements of health-food shops in an ideal manner.

Because of the natural strong leavening by means of isolated hetero-fermentative lactic acid bacteria, present in highly concentrated form, the finished bread also keeps for a longer time than does bread produced by the usual industrial methods. In the case of bread produced by the existing industrial methods, chemical preservatives, e.g. propionic acid, are added to improve the keeping properties. Since, in accordance with the invention, no preservatives are required, they cannot have an adverse effect upon the taste of the baked goods produced. Furthermore, the present baking method is simplified by the absence of preservatives and can be carried out much more economically.

The following Example illustrating the invention and comparative Example based on prior art methods illustrate particularly clearly the advantages achieved by the invention as regards the saving in the quantity of initial dough.

1. Example based on prior art (German Patent Specification AS 1 241 382)

In a modified method of carrying out shortening, a starting material comprised a mixture of 1600 g rye flour, 2380 g of water and 24 g of liquid bacteriological inoculant and was leavened for 12 hours at 28° C. To produce an initial dough, 2400 g of rye flour, 3560 g of water and 36 g of bacteriological liquid inoculant were added to the above quantity and the mixture was further leavened for 4 hours at 28° C.

The main dough was produced using 400 g of initial dough, 240 g of rye flour, 20 g of water, 4 g of yeast and 7 g of salt.

As in a shortening method, no further leavening occurred in the main dough, but the yeast was activated in the following 40-minute batchwise fermentation. Fermentation was followed by baking.

2. Example illustrating the invention

To produce a leavening concentrate, 150 g of rye groats, 150 g of water and 15 g of isolated bacteriological inoculant, selected from the hetero-fermentative lactic acid bacteria group, were mixed together and allowed to form acid for 48 hours at 27° C. while the mixture was gently stirred. The main dough was produced from 275 g of this leavening concentrate, 600 g of cereal groats, 450 g of water, 10 g of dry yeast and 15 g of salt. Without any further intermediate leavening step, this main dough was baked after fermentation lasting approximately 45 minutes.

The following tabular comparison shows the main components used in the known method, set against those used in the method in accordance with the invention:

|  | According to German Patent Specification AS 1,241,382. (Example 2 doubled amount) | In Accordance with the present invention |
|---|---|---|
| Initial dough or leavening dough concentrate | 800 | 275 |
| Rye flour or groats | 480 | 600 |
| Water | 40 | 450 |
| Yeast | 8 | 10 |
| Salt | 14 | 15 |
| Quantity of dough produced | 1342 | 1350 |

This comparison clearly shows that the known method (Example 2 of German Patent Specification No. AS 1 241 382 can be regarded as a fair average among the known methods) apart from having to use intermediate leavening stages, which have to be kept to certain periods and are very time-consuming, also uses considerably greater quantities of initial dough. Since the quantities of initial dough used in the prior art method are leavened to a considerably lesser degree, a very much larger quantity is necessary, and this is the decisive factor contributing to the poor economics of baking by means of natural leavened dough, using the prior art methods.

What is claimed is:

1. A method of producing a naturally leavened initial dough capable of storage for extended periods for the preparation of bread and pastries, comprising the steps of adding to a cereal mash a culture of isolated heterofermentative leavening dough bacteria, which bacteria form lactic acid and acetic acid, and thereafter fermenting the mixture of bacteria and cereal mash to form lactic and acetic acid in said cereal mash, wherein
    (a) the relative amounts of bacteria and cereal mash are sufficient, and
    (b) the fermentation is carried out for a period of time sufficient to essentially complete bacteriological metabolic activity, so that such activity is inhibited to an extent sufficient to produce a self-preservation effect in the dough.

2. The method of producing a naturally leavened dough for the preparation of bread and pastries as claimed in claim 1, further comprising the step of packaging the leavening dough that has formed acid in an air-tight manner.

3. The method of producing a naturally leavened dough for the preparation of bread and pastries as claimed in claim 2, further comprising the step of subjecting the fermented leavened dough to a drying treatment.

4. The method of producing a naturally leavened dough for the preparation of bread and pastries as claimed in claim 1, wherein the bacteria is *Lactobacillus brevis*.

5. The method of producing naturally leavened dough for the preparation of bread and pastries as claimed in claim 1, wherein the bacteria is *Lactobacillus fermenti*.

6. A method of producing bread, comprising the steps of mixing and kneading together the initial naturally leavened dough formed by the method claimed in claim 1, a quantity of cereal groats or meal, a quantity of water and a salt mixture; permitting a second fermentation; and baking.

7. The method as defined by claim 1, wherein said self-preservation effect is sufficient to enable the dough to be stored for about six months.

8. An initial naturally leavened dough capable of storage for extended periods, produced by the process defined by claim 1.

9. A leavened dough produced by adding the initial dough of claim 8 to a mixture comprising cereal groats or meal, water, salt and yeast, and allowing the mixture to ferment.

10. A method for producing a naturally leavened dough, comprising the steps of producing a naturally leavened initial dough by the method according to claim 1, adding said leavened initial dough to a mixture comprising cereal groats or meal, water, salt and yeast, and allowing the mixture to ferment a second time.

11. A method for producing a naturally leavened dough as defined by claim 1, wherein said cereal mash comprises a mixture of water and cereal flour or meal in a proportion sufficient to produce a liquid initial dough.

12. A method for producing a naturally leavened dough as defined by claim 11, wherein the water and cereal flour or meal are present in equal proportions.

13. A method for producing a naturally leavened dough as defined by claim 12, wherein said leavening dough bacteria is added in an amount of about 10% of the amount of the cereal.

14. A method for producing a naturally leavened dough as defined by claim 13, wherein said fermentation step is carried out for a period of approximately 48 hours at a temperature of approximately 27° C.

15. A method for producing a naturally leavened dough as defined by claim 14, comprising the steps of forming said cereal mash from 10 parts by weight of rye groats and 10 parts by weight of water and adding thereto 1 part by weight of said isolated bacteria.

16. An initial naturally leavened dough capable of storage for extended periods of time, produced by the process defined by claim 11.

17. A method for producing bread as claimed in claim 6, wherein said second fermentation is carried out for about 45 minutes.

18. A method for producing a naturally leavened dough as claimed in claim 10, wherein said second fermentation is carried out for about 45 minutes.

19. A method for producing bread as claimed in claim 6, comprising the steps of forming a cereal mash from 10 parts by weight of rye groats and 10 parts by weight of water, adding thereto 1 part by weight of said isolated bacteria, carrying out said fermentation step for a period of about 48 hours at a temperature of about 27° C. with gentle stirring of cereal mash-bacteria mixture to produce a leavening concentrate, after said fermentation step mixing 275 parts by weight of the leavening concentrate with 600 parts by weight of cereal groats, 450 parts by weight of water, 10 parts by weight of dry yeast, and 15 parts by weight of table salt to produce a main dough, carrying out a second fermentation step for about 45 minutes and thereafter baking the main dough.

20. A method for producing a naturally leavened dough as claimed in claim 10, comprising the steps of forming a cereal mash from 10 parts by weight of rye groats and 10 parts by weight of water, adding thereto 1 part by weight of said isolated bacteria, carrying out said fermentation step for a period of about 48 hours at a temperature of about 27° C. with gentle stirring of cereal mash-bacteria mixture to produce a leavening concentrate, and after said fermentation step mixing 275 parts by weight of the leavening concentrate with 600 parts by weight of cereal groats, 450 parts by weight of water, 10 parts by weight of dry yeast and 15 parts by weight of table salt to produce a main dough.

21. A method of producing a naturally leavened initial dough capable of storage for extended periods for the preparation of bread and pastries comprising the steps of adding to a cereal mash, comprised of equal parts of water and cereal groats, a culture of isolated hererofermentative leavening dough bacteria in an amount of 10% of the quantity of the cereal groats, which bacteria form lactic and acetic acid, and thereafter fermenting the mixture of bacteria and cereal mash to form lactic and acetic acid in said cereal mash, wherein the fermentation is carried out for a period of time sufficient to essentially complete bacteriological metabolic activity.

22. The method as defined by claim 21, wherein said fermentation is carried out for a period of approximately 48 hours at a temperature of approximately 27° C.

23. In a method for producing a naturally leavened dough by fermentation with a leavening dough bacteria, the improvement comprising employing as said leavening dough bacteria an isolated heterofermentative leavening dough bacteria which forms lactic acid and acetic acid, and carrying out said fermentation for a period of time sufficient to essentially complete bacteriological metabolic activity in the dough.

24. The method as defined by claim 23, wherein said leavening dough bacteria is *Lactobacillus brevis* or *Lactobacillus fermenti*.

* * * * *